(12) United States Patent
Nakamura et al.

(10) Patent No.: US 12,240,398 B2
(45) Date of Patent: Mar. 4, 2025

(54) ATTACHMENT STRUCTURE OF VEHICULAR MODULE TO CEILING OF VEHICLE CABIN

(71) Applicant: SUBARU CORPORATION, Tokyo (JP)

(72) Inventors: Ryota Nakamura, Tokyo (JP); Tomoya Kanagawa, Tokyo (JP); Kousei Kawamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 384 days.

(21) Appl. No.: 17/744,154

(22) Filed: May 13, 2022

(65) Prior Publication Data

US 2022/0379831 A1     Dec. 1, 2022

(30) Foreign Application Priority Data

May 28, 2021   (JP) ................. 2021-089846

(51) Int. Cl.
*B60R 21/015*     (2006.01)
*B60Q 3/51*       (2017.01)
(Continued)

(52) U.S. Cl.
CPC .......... *B60R 21/01512* (2014.10); *B60Q 3/51* (2017.02); *B60R 7/04* (2013.01);
(Continued)

(58) Field of Classification Search
CPC ..... B60R 21/01512; B60R 7/04; B60R 11/04; B60R 2011/0028; B60R 2011/0045;
(Continued)

(56) References Cited

U.S. PATENT DOCUMENTS 9,802,656 B1 * 10/2017 Williams ................ G01S 17/89
2018/0281868 A1    10/2018 Tulett et al.

FOREIGN PATENT DOCUMENTS

| CN | 108657286 A | 10/2018 |
| JP | 2007-230264 A | 9/2007 |

(Continued)

OTHER PUBLICATIONS

Office Action dated Jan. 7, 2025 for Japanese Patent Application No. 2021-089846 (2 pages in Japanese, with 4 page English translation).

*Primary Examiner* — Amy R Weisberg
*Assistant Examiner* — Dana D Ivey
(74) *Attorney, Agent, or Firm* — Smith, Gambrell & Russell, LLP (57) ABSTRACT

An attachment structure of a vehicular module to a ceiling of a vehicle cabin of a vehicle includes a design member. The design member is configured to attach, to the ceiling, the module including an in-cabin sensor configured to perform detection in the vehicle cabin, and includes a securing portion configured to be secured to a vehicle-body ceiling member of the vehicle or an interior ceiling member disposed on a vehicle cabin side of the vehicle-body ceiling member, a downward protrusion protruding downward from the securing portion, and a design constituent extending from the downward protrusion and covering the securing portion. In an accommodating space defined between the downward protrusion and the design constituent, the in-cabin sensor is supported by the design member in such a manner that, above the accommodating space, a gap is left between the in-cabin sensor and the vehicle-body ceiling member or the interior ceiling member.

18 Claims, 8 Drawing Sheets

(51) Int. Cl.
*B60R 7/04* (2006.01)
*B60R 11/04* (2006.01)
*B60R 11/00* (2006.01)
*B60R 11/02* (2006.01)
*B60R 21/055* (2006.01)

(52) U.S. Cl.
CPC .............. *B60R 11/04* (2013.01); *B60R 11/00* (2013.01); *B60R 2011/0028* (2013.01); *B60R 2011/0045* (2013.01); *B60R 2011/0075* (2013.01); *B60R 11/0264* (2013.01); *B60R 21/0153* (2014.10); *B60R 21/01532* (2014.10); *B60R 21/055* (2013.01)

(58) Field of Classification Search
CPC ... B60R 11/0264; B60R 21/055; B60R 11/00; B60R 2011/0075; B60R 21/0153; B60R 21/01532; B60Q 3/51
USPC ........................................................ 296/1.08
See application file for complete search history.

(56) References Cited

FOREIGN PATENT DOCUMENTS

| | | | | |
|---|---|---|---|---|
| JP | 2008201221 | A | * | 9/2008 |
| JP | 2009-274624 | A | | 11/2009 |
| JP | 2011207320 | A | * | 10/2011 |
| JP | 2017-181225 | | | 10/2017 |
| JP | 2017181225 | A | * | 10/2017 |

\* cited by examiner

ATTACHMENT STRUCTURE OF VEHICULAR MODULE TO CEILING OF VEHICLE CABIN

CROSS-REFERENCE TO RELATED APPLICATIONS

The present application claims priority from Japanese Patent Application No. 2021-089846 filed on May 28, 2021, the entire contents of which are hereby incorporated by reference.

BACKGROUND

The disclosure relates to an attachment structure of a vehicular module to a ceiling of a vehicle cabin.

In an automobile and other vehicle, various modules, such as components operated by an occupant and components for user interface with the occupant, are laid out in the vicinity of the occupant seated in a seat in a vehicle cabin.
For example, map lamps, a dome lamp, a storage box, and other modules are disposed on a ceiling of the vehicle cabin. These modules disposed on the ceiling of the vehicle cabin are basically buried in the ceiling of the vehicle cabin.

SUMMARY

An aspect of the disclosure provides an attachment structure of a vehicular module to a ceiling of vehicle cabin of a vehicle. The design member includes a design member configured to attach, to the ceiling, the module including an in-cabin sensor configured to perform detection in the vehicle cabin. The design member includes a securing portion configured to be secured to a vehicle-body ceiling member of the vehicle or an interior ceiling member disposed on a vehicle cabin side of the vehicle-body ceiling member, a downward protrusion protruding downward from the securing portion, and a design constituent extending from the downward protrusion and covering the securing portion so as to constitute a design as the design member. In an accommodating space defined between the downward protrusion and the design constituent, the in-cabin sensor is supported by the design member in such a manner that, above the accommodating space, a gap is left between the in-cabin sensor and the vehicle-body ceiling member or between the in-cabin sensor and the interior ceiling member.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Recently, automobiles have begun to be equipped with imaging sensors to capture images of an occupant in a vehicle cabin so as to improve safety of the automobiles.

Japanese Unexamined Patent Application Publication (JP-A) No. 2017-181225 discloses a technique of transmitting a radio wave (electromagnetic wave) to a vehicle cabin and receiving its reflected wave so as to detect an occupant in the vehicle cabin.

It is considered that use of information regarding the vehicle cabin detected by such in-cabin sensors enables a controller of an automobile to determine whether an occupant is present and determine the vital status of the occupant.

In order to detect an occupant in the vehicle cabin, the in-cabin sensors are to be oriented toward the occupant riding in the vehicle cabin, for example, the occupant seated in a seat. Therefore, in JP-A No. 2017-181225, an in-cabin sensor to exchange radio waves is disposed on an upper portion of an A-pillar on a front side of the vehicle cabin. Thus, a plurality of occupants in the vehicle cabin can be included in a range to which the in-cabin sensor transmits a radio wave so that the plurality of occupants in the vehicle cabin can be detected by the single in-cabin sensor.

However, when the in-cabin sensor is disposed on the upper portion of the A-pillar as disclosed in JP-A No.

2017-181225, in a wide range in the vehicle cabin, for example, a child crouching down at the foot of the rear seat and a child sitting in a seat or the baggage compartment behind the rear seat are in the blind spot from the in-cabin sensor. It is difficult for the in-cabin sensor disposed on the upper portion of the A-pillar to widely detect the vehicle cabin. In order to compensate for the blind spot, another in-cabin sensor is to be added.

As described so far, in a vehicle, it is desirable to install an in-cabin sensor configured to perform detection in a vehicle cabin in such a manner that the vehicle cabin can be widely detected.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
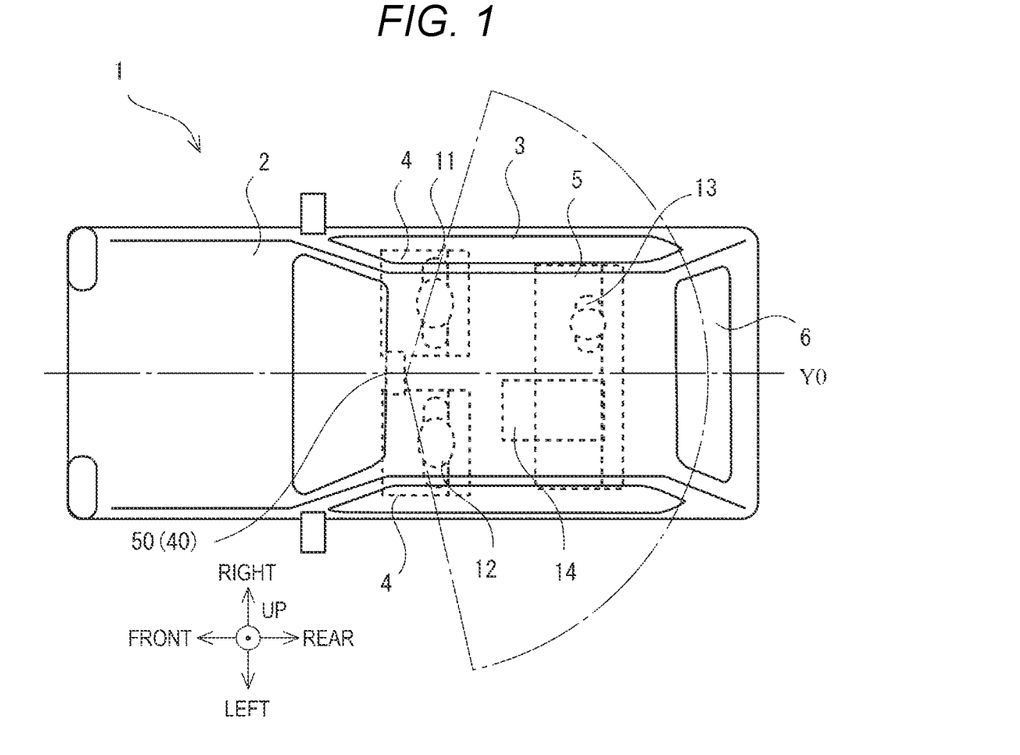
FIG. 1 is a schematic plan view of an automobile according to an embodiment of the disclosure.
Figure 2:
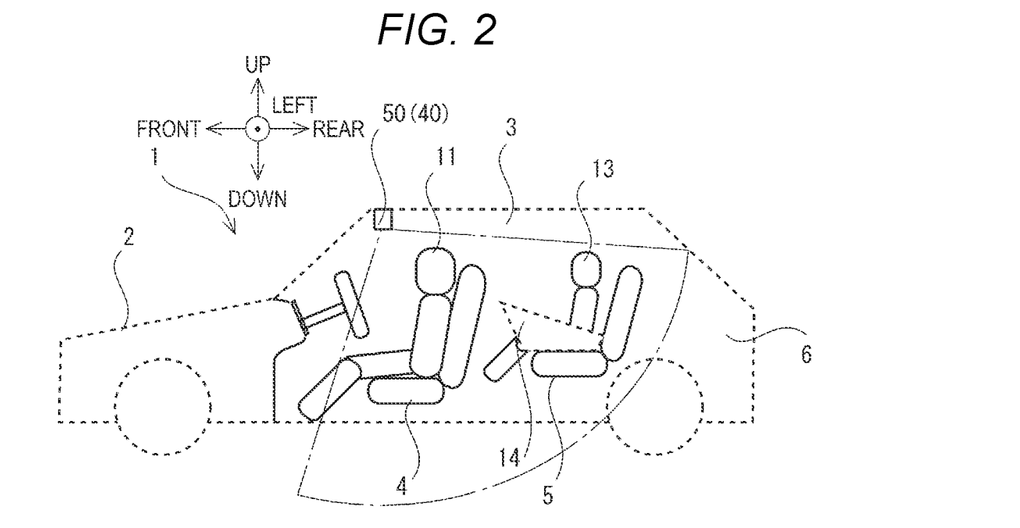
FIG. 2 is a schematic vertical cross-sectional view of the automobile in FIG. 1.

FIG. 1 is a schematic plan view of an automobile 1 according to the embodiment of the disclosure. FIG. 2 is a schematic vertical cross-sectional view of the automobile 1 in FIG. 1. The vertical cross-sectional view of FIG. 2 illustrates a cross section of the automobile 1 in FIG. 1, taken along a center position Y0 in a vehicle width direction of the automobile 1.

The automobile 1 is an example of a vehicle body 2. A power source of the automobile 1 may be an internal combustion engine where gasoline or ethanol is combusted, an electric motor using, for example, accumulated power, a power source using hydrogen, or a combination of these power sources.

The automobile 1 illustrated in FIGS. 1 and 2 includes the vehicle body 2. The vehicle body 2 includes a vehicle cabin 3 that can hold a plurality of occupants. The vehicle cabin 3 includes a plurality of rows of seats 4 and 5 disposed in a fore-and-aft direction of the automobile 1. The rear seat 5 is disposed behind the plurality of front seats 4. A baggage compartment 6 is disposed behind the rear seat 5.

A driver 11 enters the vehicle cabin 3 by opening and closing a right front door, not illustrated, and sits in the driver's front seat 4. The driver 11 exits the vehicle cabin 3 by opening and closing the right front door.

A fellow passenger 12 enters the vehicle cabin 3 by opening and closing, for example, a left front door, not illustrated, and sits in the fellow passenger's front seat 4. The fellow passenger 12 exits the vehicle cabin 3 by opening and closing the left front door.

A child 13 enters the vehicle cabin 3 by opening and closing, for example, a right rear door or a left rear door, not illustrated, and sits in the rear seat 5. The child 13 exits the vehicle cabin 3 by opening and closing the right rear door or the left rear door. In the case of an infant, for example, who is to be assisted, an adult such as the driver 11 and the fellow passenger 12 attaches a child car seat 14 onto the rear seat 5 and tucks the infant into the child car seat 14 by opening and closing the right rear door or the left rear door. It is noted that the child car seat 14 and the child 13 may be attached onto and seated in the fellow passenger's front seat 4. The fellow passenger 12 may be seated in the rear seat 5.

An adult and the child 13 seated directly in the seats 4 and 5 put on seatbelts, not illustrated. Thus, the occupants are seated in the seats 4 and 5 with the upper bodies leaning against the backs of the seats 4 and 5. Seated positions of the occupants in the seats 4 and 5 are basically within a predetermined range in the vehicle cabin 3.

Then, with the occupants including the driver 11 and the fellow passenger 12 riding in the automobile 1 and seated in the seats 4 and 5 in the vehicle cabin 3, the automobile 1 travels by driving operation by the driver 11, driver assistance, or self-driving.

It is desirable for such an automobile 1, for example, to monitor the occupants in the vehicle cabin 3 during traveling so that an emergency call and an emergency stop can be controlled in an emergency of the occupants.

Figure 3:
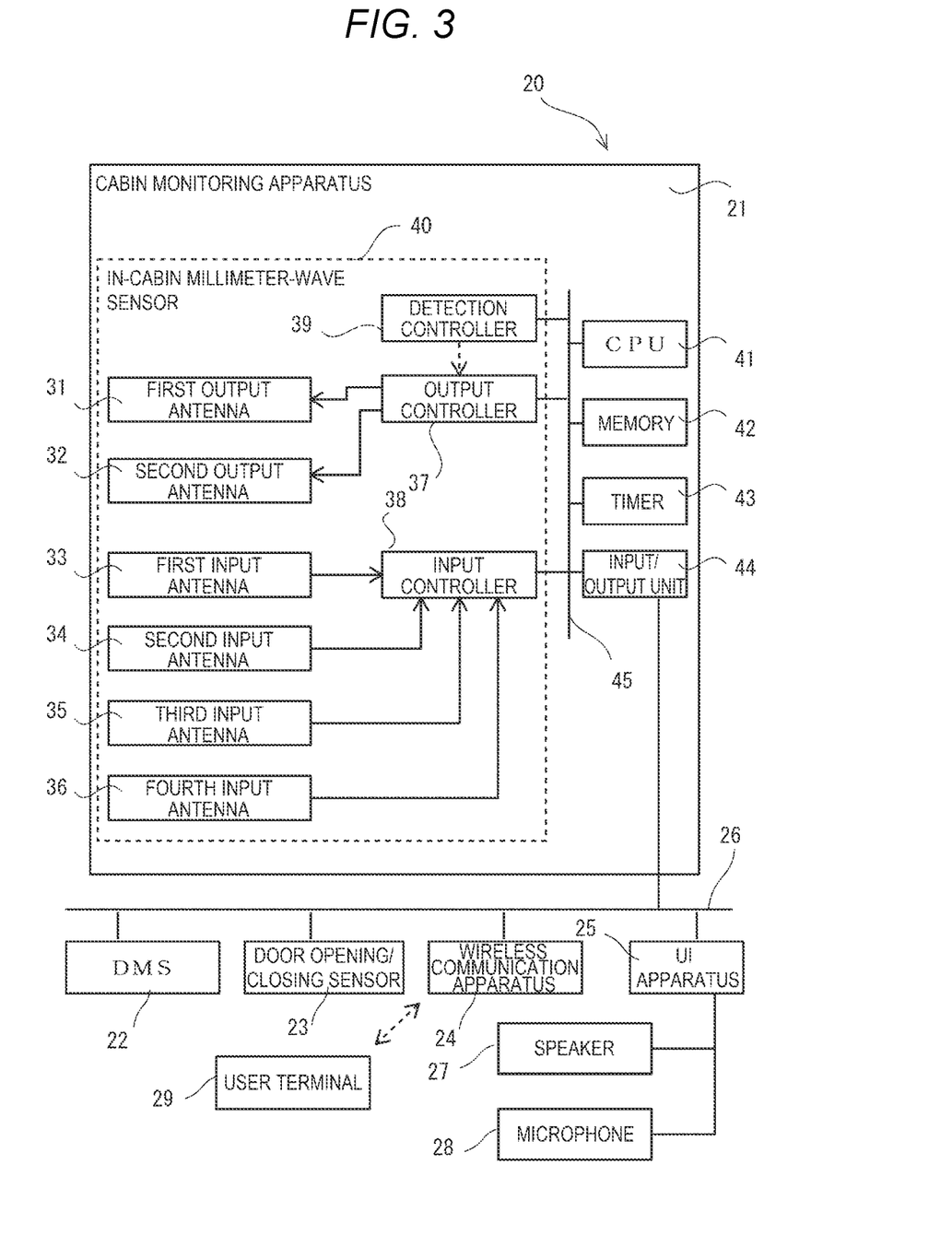
FIG. 3 is a diagram illustrating a control system including an in-cabin millimeter-wave sensor for the automobile in FIG. 1.

FIG. 3 is a diagram illustrating a control system 20 for the automobile 1 in FIG. 1. The control system 20 includes an in-cabin millimeter-wave sensor 40.

The control system 20 in FIG. 3 can detect and determine an in-cabin object such as an occupant and baggage in the vehicle cabin 3 so as to output an alert in accordance with a state of the occupant.

The control system 20 in FIG. 3 includes a cabin monitoring apparatus 21, an occupant monitoring apparatus (DMS) 22, a door opening/closing sensor 23, a wireless communication apparatus 24, a user interface apparatus (UI apparatus) 25, and an in-vehicle network 26 via which these apparatus are connected.

The in-vehicle network 26 may be a wired communication network in conformity to, for example, Controller Area Network (CAN) and Local Interconnect Network (LIN) for the automobile 1. The in-vehicle network 26 may be a communication network such as LAN or a combination of these networks. The in-vehicle network 26 may partly include a wireless communication network.

Figure 6:
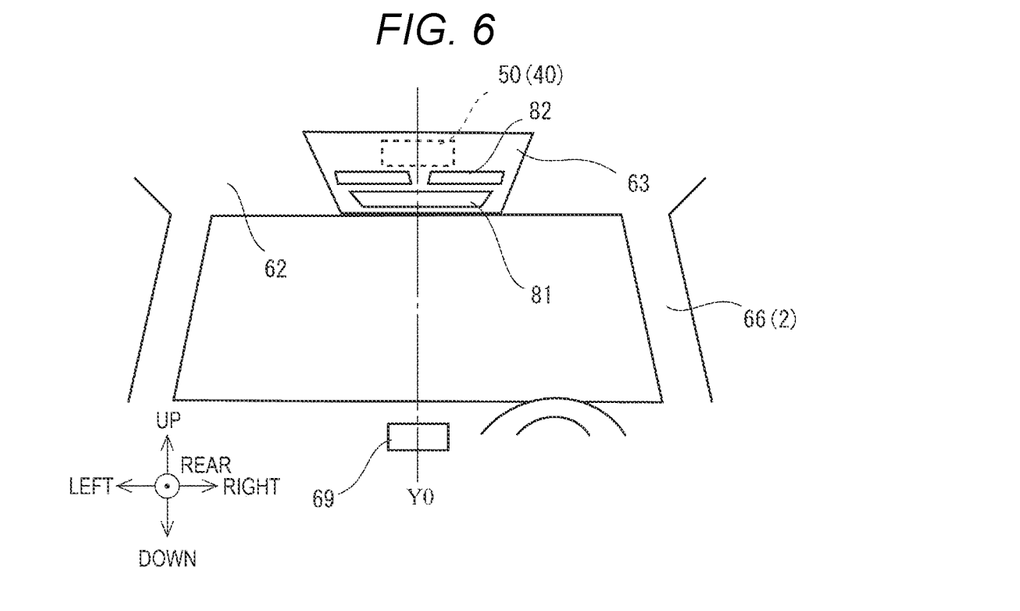
FIG. 6 is a diagram illustrating an arrangement of a plurality of modules including the plate-shaped sensor member of the cabin monitoring apparatus in FIG. 3, in an overhead console disposed on a front center portion of a ceiling of a vehicle cabin of the automobile in FIG. 1.

The occupant monitoring apparatus 22 includes, for example, an imaging device and an illuminating device. As illustrated in FIG. 6, described later, the occupant monitoring apparatus 22 is disposed in a center portion (Y0 position) of a dashboard of the vehicle body 2 in the vehicle width direction. The occupant monitoring apparatus 22 may discriminate occupants such as the driver 11 riding in the vehicle cabin 3 so as to perform set control in accordance with the occupants. Moreover, based on a captured image of the head of the driver 11, the occupant monitoring apparatus 22 may determine a distracted or drowsy state of the driver 11 and output an alert.

The door opening/closing sensor 23 detects opening/closing of a plurality of doors, not illustrated, of the automobile 1. The door opening/closing sensor 23 may be provided for each of the doors opened/closed, such as the right front door, the left front door, the right rear door, and the left rear door described above, as well as a hatchback door at the rear of the vehicle body 2. Upon detecting opening/closing of each door of the automobile 1, the door opening/closing sensor 23 supplies detection data to each unit of the automobile 1 via the in-vehicle network 26.

The wireless communication apparatus 24 establishes a wireless communication path to a wireless communication base station, not illustrated, disposed outside the automobile 1. The wireless communication apparatus 24 exchanges data among a server apparatus and a user terminal 29 that are connected to the base station. Examples of the wireless communication base station include a commercial mobile communication base station and abase station for exchanging traffic information. The wireless communication apparatus 24 may be in conformity with a high-speed communication standard such as International Mobile Telecommunications-2020 (IMT-2020) and Institute of Electrical and Electronics Engineers (IEEE) 802.11ax. When obtaining data transmitted by each unit of the automobile 1 via the in-vehicle network 26, the wireless communication apparatus 24 transmits the data to the server apparatus and the user terminal 29 via the base station. In response to reception of the data from the server apparatus and the user terminal 29 via the base station, the wireless communication apparatus 24 outputs the received data to each unit of the automobile 1 via the in-vehicle network 26.

The user interface apparatus 25 is connected to, for example, a liquid crystal device, a touch panel device, various switches, a speaker 27, and a microphone 28, which are disposed in the vehicle cabin 3 of the automobile 1. When obtaining output data from each unit of the automobile 1 via the in-vehicle network 26, the user interface apparatus 25 outputs the data from the liquid crystal device and the speaker 27. Thus, the occupants can gain access to information of the automobile 1 such as the content of an alert via the user interface apparatus 25. In response to operational input to the touch panel device or the switches or predetermined vocal input to the microphone 28, the user interface apparatus 25 outputs such input data to each unit of the automobile 1 via the in-vehicle network 26.

The cabin monitoring apparatus 21 monitors occupants and objects present in the vehicle cabin 3. The cabin monitoring apparatus 21 includes the in-cabin millimeter-wave sensor 40, a CPU 41, a memory 42, a timer 43, an input/output unit 44, and an internal bus 45 connected to these units. Each unit of the cabin monitoring apparatus 21 exchanges data via the internal bus 45.

The in-cabin millimeter-wave sensor 40 includes an output controller 37, an input controller 38, and a detection controller 39. A first output antenna 31 and a second output antenna 32 to output a millimeter wave are connected to the output controller 37. A first input antenna 33, a second input antenna 34, a third input antenna 35, and a fourth input antenna 36 to receive reflected waves of the millimeter wave are connected to the input controller 38. The detection controller 39 controls operation of these components.

The output controller 37 individually controls output of a detection radio wave at a frequency in the millimeter band from the first output antenna 31 and output of a detection radio wave at a frequency in the millimeter band from the second output antenna 32. A millimeter-band detection radio wave may be output in two channels at output timings deviated from each other or simultaneously. The millimeter-band detection radio wave may be output continuously or intermittently in terms of time. Different kinds of encoded data may be superposed on the millimeter-band detection radio wave from the first output antenna 31 and the millimeter-band detection radio wave from the second output antenna 32.

The input controller 38 monitors input of reflected waves to the first input antenna 33, input of reflected waves to the second input antenna 34, input of reflected waves to the third input antenna 35, and input of reflected waves to the fourth input antenna 36. The millimeter-band detection radio wave output in the two channels may be input to the four antennas in eight channels. An input timing of a reflected wave to each of the input antennas accords with a distance from the output antenna as an output origin to a reflection object and a distance from the reflection object to the input antenna. Basically, a distance and a direction of the reflection object when these antennas are regarded as a reference are uniquely specifiable three-dimensionally by inputting reflected waves from the identical reflection object to at least two or more of the input antennas. However, a plurality of reflected waves by a plurality of reflection objects in a plurality of directions may be simultaneously input to a single input antenna. For example, when output in two channels is combined with input in four channels, a reflected wave component in each direction can be separated from a composite wave, which is a mixture of the plurality of reflected waves, so as to calculate a distance to the reflection object in each direction. Spatial resolution, for example, to detect a plurality of occupants present in the vehicle cabin 3 can be secured by contriving encoded data superposed onto the detection radio waves, timing control, and other factors.

The detection controller 39 controls output of millimeter-band detection radio waves in two channels by the output controller 37 and input of reflected waves in four channels by the input controller 38. In addition to timing control of the output controller 37 and the input controller 38, the detection controller 39 may set a frequency of a millimeter-band detection radio wave output by the first output antenna 31 and the second output antenna 32 under control by the output controller 37. Millimeter waves at high frequencies equal to or higher than 60 GHz as well as millimeter waves at frequencies approximately as low as 24 GHz, for example, have been put to practical use. The detection controller 39 may select one frequency from among a plurality of frequencies of, for example, 24 GHz, 60 GHz, and 74 GHz, and set the frequency for the output controller 37. When the frequency is set, the output controller 37 controls the first output antenna 31 and the second output antenna 32 to output a millimeter-band detection radio wave at the set frequency.

In this manner, the output controller 37, the first output antenna 31, the second output antenna 32, the input controller 38, the first input antenna 33, the second input antenna 34, the third input antenna 35, the fourth input antenna 36, and the detection controller 39 can serve as the in-cabin millimeter-wave sensor 40 to output a radio wave to the vehicle cabin 3 of the automobile 1 and detect a reflected wave by an occupant present in the vehicle cabin 3 of the automobile 1.

The input/output unit 44 is connected to the in-vehicle network 26. The input/output unit 44 exchanges data with each unit of the automobile 1 via the in-vehicle network 26.

The timer 43 measures periods of time and times of day. For example, the timer 43 may measure a cyclic timing to output a detection radio wave and elapsed time after each output timing of the detection radio wave.

The memory 42 records a program executed by the CPU 41, data used for executing the program, and data generated by executing the program. A nonvolatile memory such as a RAM and a nonvolatile memory such as an SSD or an HDD may constitute the memory 42.

The CPU 41 reads the program from the memory 42 and executes the program. Thus, in the cabin monitoring apparatus 21, a controller to totally control the cabin monitoring apparatus 21 is implemented.

The CPU 41 as the controller may determine a kind of, for example, an in-cabin object such as an occupant and an object present in the vehicle cabin 3 based on, for example, detection of millimeter-band reflected waves by the in-cabin millimeter-wave sensor 40, and the CPU 41 may monitor the in-cabin object.

At this time, the CPU 41 as the controller may select a frequency of the millimeter-band detection radio wave from among the preset plurality of frequencies and may instruct the detection controller 39 to perform setting. A frequency of a radio wave setting of which is to be instructed by the CPU 41 may be a plurality of frequencies including a first frequency of 60 GHz, for example, and a second frequency of 24 GHz, for example, lower than the first frequency. In this case, the detection controller 39 performs the setting instructed by the CPU 41 and changes the frequency of the millimeter-band detection radio wave.

In addition to this, for example, the CPU 41 as the controller may monitor whether the occupant or baggage of the kind determined has gotten into the vehicle cabin 3, been seated, alighted, and been left behind.

Next, a description will be given on a plate-shaped sensor member 50 where the in-cabin millimeter-wave sensor 40 of the cabin monitoring apparatus 21 in FIG. 3 is formed.

The plate-shaped sensor member 50 may be a printed board of a flat plate shape of a business card size, for example. The printed board includes wiring layers on both surfaces and inside. The plate-shaped sensor member 50 in FIG. 3 includes a detection surface 51 illustrated in FIG. 4 and a rear surface 52 of the detection surface 51 illustrated in FIG. 5.

Figure 4:
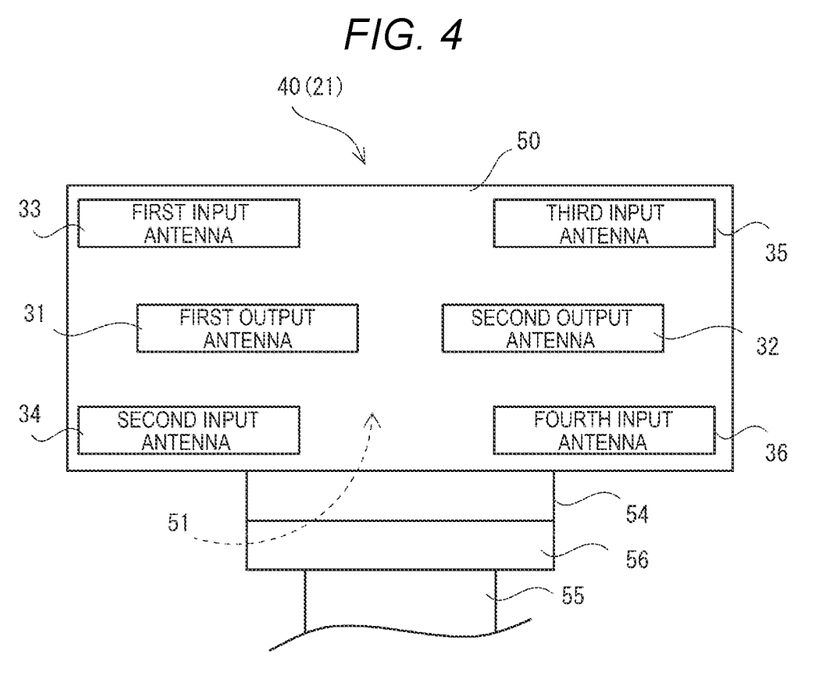
FIG. 4 is a diagram illustrating a plate-shaped sensor member where the in-cabin millimeter-wave sensor of a cabin monitoring apparatus in FIG. 3 is formed, as viewed from a detection surface side.

FIG. 4 is a diagram illustrating the plate-shaped sensor member 50 where the in-cabin millimeter-wave sensor 40 of the cabin monitoring apparatus 21 in FIG. 3 is formed, as viewed from the detection surface 51 side.

Using the wiring layers of the printed board, the first output antenna 31, the second output antenna 32, the first input antenna 33, the second input antenna 34, the third input antenna 35, and the fourth input antenna 36 of the in-cabin millimeter-wave sensor 40 are formed on the detection surface 51 of the plate-shaped sensor member 50 in FIG. 4.

The first output antenna 31 and the second output antenna 32 are formed in a center portion of the rectangular detection surface 51 in such a manner that the first output antenna 31 and the second output antenna 32 are disposed along the vehicle width direction when attached to the vehicle body 2.

The first input antenna 33, the second input antenna 34, the third input antenna 35, and the fourth input antenna 36 are formed in four corners of the rectangular detection surface 51.

With such an antenna layout of a symmetric distribution, a millimeter wave output from each of the output antennas is reflected by an in-cabin object in the vehicle cabin 3 and easily received by each of the input antennas.

Basically, when a direction of the normal to the detection surface 51 is a detection direction, the in-cabin millimeter-wave sensor 40 can detect an object in an angle range about the detection direction.

Figure 5:
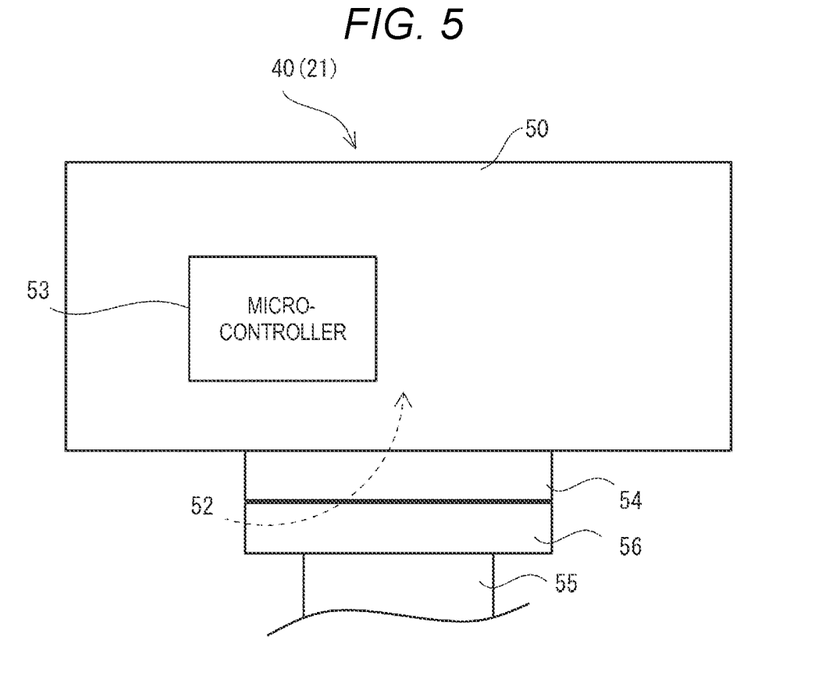
FIG. 5 is a diagram illustrating the plate-shaped sensor member in FIG. 4, as viewed from the rear of the detection surface.

FIG. 5 is a diagram illustrating the plate-shaped sensor member 50 in FIG. 4, as viewed from the rear of the detection surface 51.

A microcontroller 53 is mounted on the rear surface 52 in FIG. 5. The microcontroller 53 includes components such as a memory, a CPU, and an internal bus interface. The CPU executes a program recorded on the memory so as to implement the controller of the in-cabin millimeter-wave sensor 40. A timer, for example, may be provided for the microcontroller 53. The CPU as the controller of the in-cabin millimeter-wave sensor 40 may perform control of the output controller 37, the input controller 38, and the detection controller 39 described above.

A board connector 54 protrudes sideward from a side surface of the rectangular plate-shaped sensor member 50. A cable connector 56 of a flat cable 55 made of a flexible printed board connected to the internal bus 45 of the cabin monitoring apparatus 21 in FIG. 3 is connected to the board connector 54. Via the board connector 54, the cable connector 56, and the flat cable 55, the microcontroller 53 of the plate-shaped sensor member 50 can exchange data with each of other units connected to the internal bus 45 of the cabin monitoring apparatus 21 in FIG. 3.

In this manner, the board connector 54 and the cable connector 56 may be disposed on the side surface of the plate-shaped sensor member 50 so as not to increase a thickness of the plate-shaped sensor member 50. The board connector 54 is disposed in such a manner that the cable connector 56 coupled to the board connector 54 is removably insertable in a direction along the detection surface 51 of the plate-shaped sensor member 50. It is noted that the flat cable 55 made of the flexible printed board may be held into the board connector 54 without using the cable connector 56.

FIG. 6 is a diagram illustrating an arrangement of a plurality of modules in an overhead console disposed on a front center portion of the ceiling of the vehicle cabin 3 of the automobile 1 in FIG. 1. The modules include the plate-shaped sensor member 50 of the cabin monitoring apparatus 21 in FIG. 3.

FIG. 6 is a schematic diagram illustrating the front of the vehicle body 2, as viewed from the front seats 4. A-pillars 66 are disposed on the left and right of a center windshield in FIG. 6. A plate-shaped interior ceiling member 62 that constitutes the ceiling of the vehicle cabin 3 is disposed on an upper side of the windshield.

A design member 63 of the overhead console is disposed on a front center portion of the ceiling of the vehicle cabin 3 that is adjacent to the windshield. The design member 63 of the overhead console along with the interior ceiling member 62 constitutes a design of the ceiling of the vehicle cabin 3.

In the design member 63 of the overhead console, a storage box 81, map lamps 82, and the plate-shaped sensor member 50 as the in-cabin millimeter-wave sensor 40 are disposed in sequence from the front.

In this manner, the plurality of modules, such as the storage box 81, the map lamps 82, and the plate-shaped sensor member 50 as the in-cabin millimeter-wave sensor 40, are supported by the design member 63 of the overhead console and attached to the ceiling of the vehicle cabin 3 above the head of an occupant using the vehicle cabin 3. The plate-shaped sensor member 50 as the in-cabin millimeter-wave sensor 40 that performs detection in the vehicle cabin 3 is disposed at a rearmost position in the fore-and-aft direction of the vehicle body 2 among the plurality of modules disposed in the design member 63 of the overhead console. Even though other modules are disposed in the design member 63 of the overhead console, the in-cabin millimeter-wave sensor 40 is capable of detection without being affected by, for example, reflection of millimeter waves by other modules.

In the design member 63 of the overhead console, the in-cabin millimeter-wave sensor 40 is disposed in a center portion of the vehicle body 2 in the vehicle width direction so that a distance from the driver's front seat 4 is equal to a distance from the fellow passenger's front seat 4. In the design member 63 of the overhead console, the in-cabin millimeter-wave sensor 40 is disposed to reduce a difference between the distances from the plurality of front seats 4 in the vehicle cabin 3 and to differ the distances from the plurality of front seats 4 in the vehicle cabin 3 from a distance from the rear seat 5 in the vehicle cabin 3. This facilitates acquisition of vital information of occupants in the front seats 4, as described later. Moreover, even when a plurality of occupants are in the rear seat 5, distances from the occupants are prevented from increasing while the occupants are discriminated from the occupants in the front seats 4, thereby facilitating detection.

Figure 7:
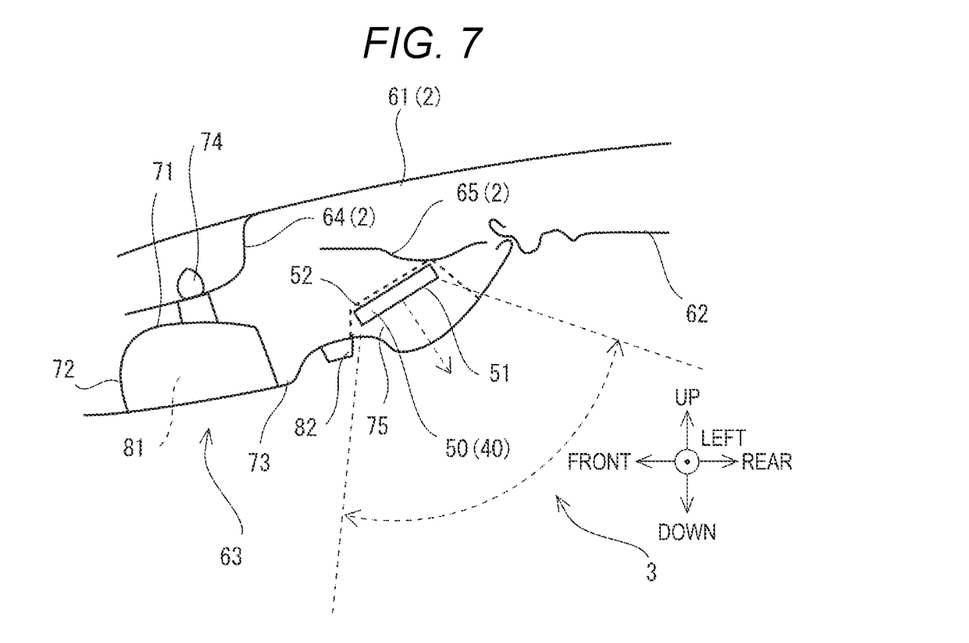
FIG. 7 is a schematic diagram illustrating a structure that attaches the plurality of modules in FIG. 6 to the ceiling of the vehicle cabin using the overhead console.

FIG. 7 is a schematic diagram illustrating a structure that attaches the plurality of modules 81, 82, and 40 in FIG. 6 to the ceiling of the vehicle cabin 3 using the design member 63 of the overhead console.

FIG. 7 illustrates a roof panel 61, a roof cross member 64, and a partition plate 65 as vehicle-body ceiling members that constitute the ceiling of the vehicle body 2. The roof cross member 64 extends in a ceiling portion of the vehicle body 2 in the vehicle width direction. The roof panel 61 is welded on the roof cross member 64 and constitutes an exterior design surface of the vehicle body 2. The partition plate 65 is disposed behind the roof cross member 64 and between the roof panel 61 and the overhead console. The partition plate 65 separates, for example, a sunroof device, not illustrated, disposed on the roof panel 61 from the overhead console so as to prevent these components from interfering with each other.

FIG. 7 also illustrates the plate-shaped interior ceiling member 62 that constitutes the ceiling of the vehicle cabin 3. The plate-shaped interior ceiling member 62 is disposed below the vehicle-body ceiling members that constitute the ceiling of the vehicle body 2, that is, on the vehicle cabin 3 side of the vehicle-body ceiling members. The interior ceiling member 62 is secured to the roof cross member 64, for example, and consequently supported at a ceiling position of the vehicle cabin 3.

The design member 63 of the overhead console is made of a resin material having flexibility and includes a securing portion 71 of a substantially flat plate shape, a surrounding wall 72, and a design constituent 73.

The securing portion 71 of the substantially flat plate shape is secured to the roof cross member 64 as the vehicle-body ceiling member of the vehicle body 2 using a rubber bush 74, for example. The securing portion 71 may be secured to the interior ceiling member 62.

The surrounding wall 72 has a substantially tubular shape to surround the securing portion 71 of the substantially flat plate shape over its entire periphery. The surrounding wall 72 of the substantially tubular shape extends along an outer periphery of the securing portion 71 and protrudes downward so as to surround the securing portion 71 over its entire periphery. Such a surrounding wall 72 serves as a downward protrusion protruding downward from the outer periphery of the securing portion 71.

The design constituent 73 extends outward from a lower end of the surrounding wall 72 of the substantially tubular shape. An outer peripheral edge of the design constituent 73 extending in a direction away from the securing portion 71 in this manner is folded back upward from the lower end of the surrounding wall 72 and bent to have a height equal to a height of the surrounding wall 72.

The outer peripheral edge of the design constituent 73 folded back and bent upward is in contact with the interior ceiling member 62 from below around a location where the securing portion 71 is secured. The outer peripheral edge of the design constituent 73 is not secured to the interior ceiling member 62 and the vehicle-body ceiling members. The design member 63 of the overhead console made of the resin material having flexibility is secured to the vehicle body 2 basically at the securing portion 71.

Thus, the design constituent 73 extends around the surrounding wall 72 of the substantially tubular shape. As illustrated in FIG. 6, a design surface of the design constituent 73 is exposed from the ceiling of the vehicle cabin 3. In the design member 63 of the overhead console, the design constituent 73 constitutes the design as the design member 63.

The surrounding wall 72 of the substantially tubular shape is used as the storage box 81.

The map lamps 82 are disposed at portions in the design constituent 73 that are adjacent to the surrounding wall 72. The plate-shaped sensor member 50 as the in-cabin millimeter-wave sensor 40 is disposed at a portion in the design constituent 73 that is behind the map lamps 82. The plate-shaped sensor member 50 as the in-cabin millimeter-wave sensor 40 is disposed in an accommodating space 75 defined by the surrounding wall 72, the design constituent 73, and the partition plate 65. The plate-shaped sensor member 50 is placed on the design constituent 73 and supported by the design constituent 73 in such a manner that a gap is left between the plate-shaped sensor member 50 and the partition plate 65 above the accommodating space 75.

Thus, in the design member 63, the in-cabin millimeter-wave sensor 40 is disposed at a position at a rear side of the securing portion 71 in the fore-and-aft direction of the vehicle body 2. A lower side of the in-cabin millimeter-wave sensor 40 is covered with the design constituent 73. The design member 63 of the overhead console may be made of a resin material having a transmissive property through which radio waves in a frequency band used by the in-cabin millimeter-wave sensor 40 can favorably transmit. The design member 63 of the overhead console may be made of a resin material having a property that enables transmission and detection of thermography.

The plate-shaped sensor member 50 as the in-cabin millimeter-wave sensor 40 is supported by the design constituent 73 while in a posture inclined rearward in a vertical direction of the vehicle body 2. The plate-shaped sensor member 50 is not parallel to the fore-and-aft direction of the vehicle body 2 and is not parallel to the vertical direction of the vehicle body 2.

With this configuration, the detection direction by the plate-shaped sensor member 50 is not a right downward direction but a diagonally rearward and downward direction of the plate-shaped sensor member 50. In this manner, the plate-shaped sensor member 50 as the in-cabin millimeter-wave sensor 40 is supported in such an inclined posture that the detection direction by the detection surface 51 is not a right downward direction but a diagonally rearward and downward direction of the plate-shaped sensor member 50. Consequently, a wide range in the vehicle cabin 3 can be detected. As illustrated in FIG. 1, the plate-shaped sensor member 50 makes detectable a wide range from the front seats 4 in the vehicle cabin 3 to the baggage compartment 6 behind the rear seat 5.

Moreover, because the plate-shaped sensor member 50 as the in-cabin millimeter-wave sensor 40 is disposed in the center of the vehicle body 2 in the vehicle width direction, detection is possible in bilateral symmetry.

It is noted that although not illustrated in particular, the board connector 54 in FIG. 3 protrudes from a side surface on the front side or a left or right side surface of the plate-shaped sensor member 50 in FIG. 7.

Next, a description will be given on how deformation occurs when the head of the driver 11 as an occupant collides against the design member 63 of the overhead console protruding downward from the front center portion of the ceiling of the vehicle cabin 3 in FIG. 7.

The design member 63 of the overhead console protrudes downward from the plate-shaped interior ceiling member 62. The head of the occupant is likely to collide against the design member 63 of the overhead console. The design member 63 of the overhead console is made easily deformable when collided with the head of the occupant so as to absorb an impact exerted on the head of the occupant.

Figure 8:
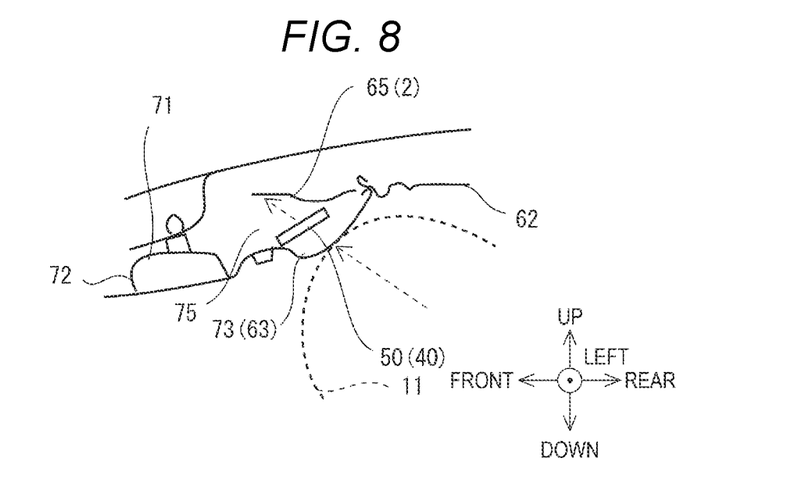
FIG. 8 is a diagram illustrating a contact state prior to deformation at the time when the head of an occupant has started to contact the overhead console protruding downward from the front center portion of the ceiling of the vehicle cabin in FIG. 7.

FIG. 8 is a diagram illustrating a contact state prior to deformation at the time when the head of the driver 11 has started to contact the design member 63 of the overhead console protruding downward from the front center portion of the ceiling of the vehicle cabin 3 in FIG. 7.

In FIG. 8, the head of the driver 11 moves from a rear lower side to a front upper side and comes into contact with the design constituent 73 of the design member 63 of the overhead console from a rear and diagonally lower side.

In the state prior to deformation in FIG. 8, a gap is left between the partition plate 65 and a lower end of the plate-shaped sensor member 50 disposed in the inclined posture in the accommodating space 75, and also, a gap is left between the partition plate 65 and an upper end of the plate-shaped sensor member 50.

Above the upper end of the plate-shaped sensor member 50 in the inclined posture, the partition plate 65 as the vehicle-body ceiling member is disposed closer to the upper end of the plate-shaped sensor member 50 than to the lower end of the plate-shaped sensor member 50.

It is noted that the upper end of the plate-shaped sensor member 50 disposed in the inclined posture in the accommodating space 75 may be in contact with the partition plate 65, and that a gap may be left at least between the lower end of the plate-shaped sensor member 50 and the partition plate 65.

Figure 9:
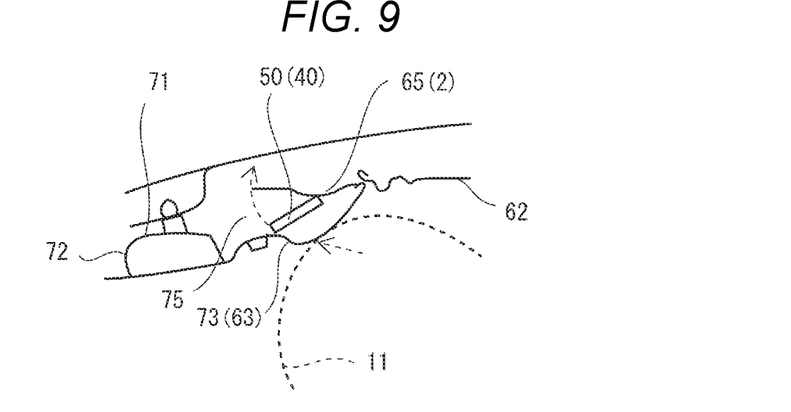
FIG. 9 is a diagram illustrating a state where the head of the occupant has pushed the overhead console in FIG. 8 upward and forward and the overhead console has started to deform.

FIG. 9 is a diagram illustrating a state where the head of the driver 11 has pushed the design member 63 of the overhead console in FIG. 8 upward and forward, and the design member 63 of the overhead console has started to deform.

When the head of the driver 11 that has come into contact with the design constituent 73 further moves forward and diagonally upward from the contact state in FIG. 8, the design constituent 73 is pushed by the head of the driver 11 and further deforms forward and diagonally upward. At this time, because the outer peripheral edge of the design constituent 73 is not secured, a relatively small force can start deforming the design constituent 73 while spreading the outer peripheral edge outward. This reduces the impact exerted on the head of the driver 11.

When the design constituent 73 deforms forward and diagonally upward, the upper end of the plate-shaped sensor member 50 as the in-cabin millimeter-wave sensor 40 that is placed on the design constituent 73 and supported in the inclined posture collides against the partition plate 65 above the accommodating space 75 for the plate-shaped sensor member 50 from below. In this state, the gap is left between the lower end of the plate-shaped sensor member 50 and the partition plate 65.

Figure 10:
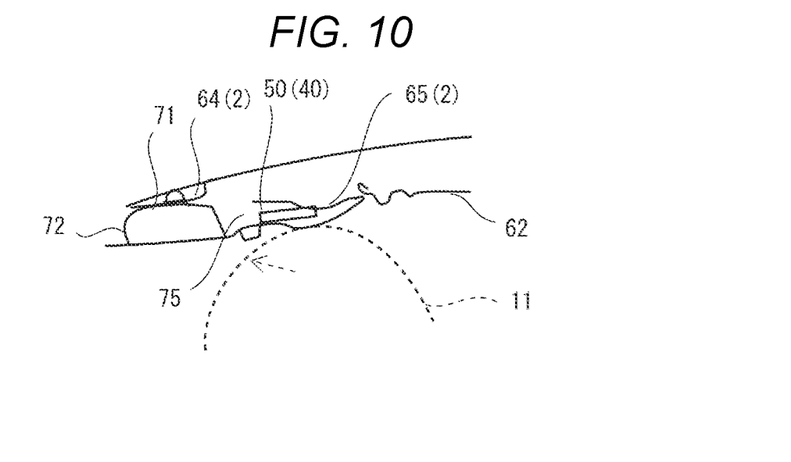
FIG. 10 is a diagram illustrating a state where the head of the occupant has pushed the overhead console further upward and forward than in FIG. 9 and the overhead console has largely deformed.

FIG. 10 is a diagram illustrating a state where the head of the driver 11 has pushed the overhead console further upward and forward than in FIG. 9, and the design member 63 of the overhead console has largely deformed.

When the head of the driver 11 pushing the design constituent 73 upward is to move further forward and diagonally upward from the pushed-up state in FIG. 9, the design constituent 73 is to be pushed by the head of the driver 11 and to deform further forward and diagonally upward. Since the upper end of the plate-shaped sensor member 50 as the in-cabin millimeter-wave sensor 40 is in contact with the partition plate 65 from below, the plate-shaped sensor member 50 turns about the contact portion serving as a turning axis. The plate-shaped sensor member 50 is eventually pressed against the partition plate 65 and takes a posture in the fore-and-aft direction and substantially parallel to the partition plate 65 so as to extend along the ceiling. The board connector 54 in FIG. 3 protrudes from a side surface on the front side or a left or right side surface of the plate-shaped sensor member 50 in FIG. 7 and does not narrow a turning range of the plate-shaped sensor member 50. The design constituent 73 with the outer peripheral edge not secured is deformable to spread the outer peripheral edge outward. Consequently, the plate-shaped sensor member 50 disposed in the inclined posture at an early stage does not restrict upward deformation of the design constituent 73 pushed by the head of the driver 11. Eventually, a relatively small force can deform the design constituent 73 to such an extent as to form a plane substantially along the interior ceiling member 62. The design constituent 73 is deformable to buckle upward easily and to the same extent as when the in-cabin millimeter-wave sensor 40 is not provided above the design constituent 73. With this configuration, even when the head of the driver 11 deforms the design constituent 73 of the overhead console as largely as illustrated in FIG. 10, the impact exerted on the head of the driver 11 can be made relatively small.

Since the board connector 54 in FIG. 3 protrudes from aside surface on the front side or a left or right side surface of the plate-shaped sensor member 50 in FIG. 7, a communication function of the connector can be maintained even after the design constituent 73 of the overhead console deforms as largely as illustrated in FIG. 10. Even when an upward force is applied to the design constituent 73 to push up the design constituent 73, the design member 63 is deformable to buckle so as not to break securing of the securing portion 71. Even after deformation as large as illustrated in FIG. 10 occurs, the plate-shaped sensor member 50 as the in-cabin millimeter-wave sensor 40 can continue performing detection in the vehicle cabin 3 without being detached from the ceiling of the vehicle cabin 3.

Next, a description will be given on a principle of detecting an in-cabin object such as an occupant by the in-cabin millimeter-wave sensor 40 in FIG. 3.

As illustrated in FIG. 1, the in-cabin millimeter-wave sensor 40 is disposed in a front edge portion of the ceiling of the vehicle cabin 3 in the automobile 1 and at the center position Y0 in the vehicle width direction of the automobile 1. The in-cabin millimeter-wave sensor 40 is disposed in a position of the so-called overhead console. The in-cabin millimeter-wave sensor 40 outputs a millimeter-band detection radio wave from the disposed position to a whole range of the vehicle cabin 3 mainly in rearward and downward directions. In this manner, the in-cabin millimeter-wave sensor 40 is disposed at a front upper position on a front side of the back of the front seat 4 in the vehicle cabin 3 and faces rearward and downward. With this configuration, a millimeter-band detection radio wave can be output to a front surface of the chest of an occupant seated in the front seat 4.

Figure 11:
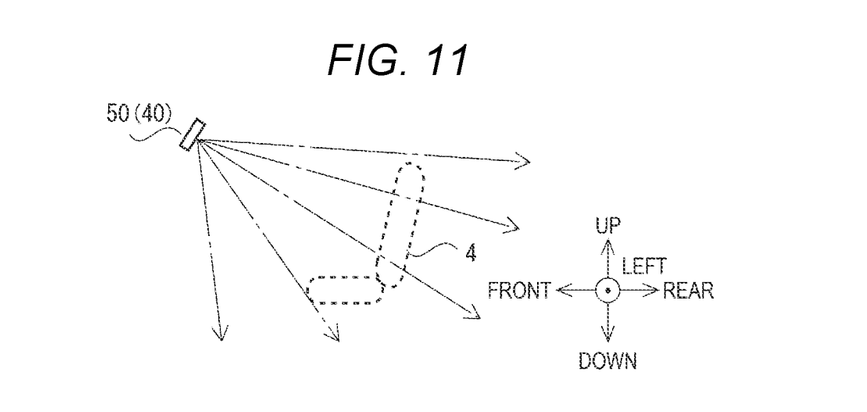
FIG. 11 is a diagram illustrating a first detection state for describing a detection principle of an in-cabin object such as an occupant by the in-cabin millimeter-wave sensor in FIG. 3.

FIG. 11 is a diagram illustrating a first detection state for describing the detection principle by the in-cabin millimeter-wave sensor 40 in FIG. 3.

FIG. 11 illustrates one of the seats 4 and the in-cabin millimeter-wave sensor 40 disposed at a position in a forward and upward direction of the seat 4. In order to detect a surface of the chest of an occupant seated in the front seat 4 in the vehicle cabin 3, the in-cabin millimeter-wave sensor 40 is disposed in the design member 63 and on a front side of a rear edge of a seated portion of the front seat 4. The in-cabin millimeter-wave sensor 40 outputs a millimeter-band detection radio wave at the set frequency from an output antenna such as the first output antenna 31 or the second output antenna 32.

In FIG. 11, no in-cabin object such as an occupant and an object is placed on the seat 4. Consequently, the millimeter-band detection radio wave output from the in-cabin millimeter-wave sensor 40 rearward and downward to the seat 4 transmits through the seat 4. Basically, the seat 4 includes a seat frame where springs are wound, which is wholly upholstered with urethane and cloth. The seat 4 of such a configuration and material hardly reflects the millimeter-band detection radio wave. As a result, a reflected wave from the seat 4 is not input to the in-cabin millimeter-wave sensor 40.

Figure 12:
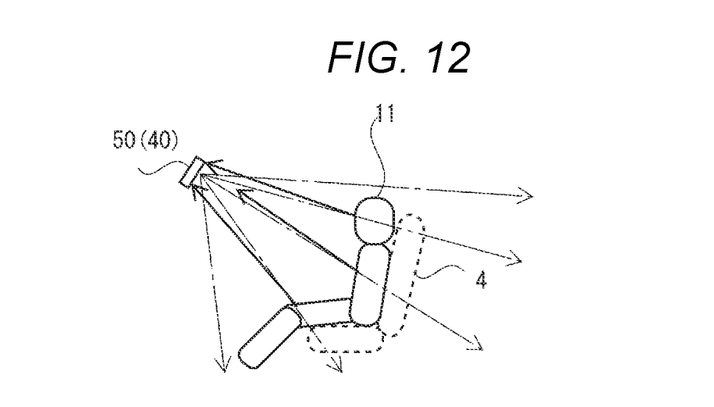
FIG. 12 is a diagram illustrating a second detection state where the occupant is seated in a seat in FIG. 11.

FIG. 12 is a diagram illustrating a second detection state where the driver 11 is seated in the seat 4 in FIG. 11. FIG. 12 illustrates the single seat 4, the in-cabin millimeter-wave sensor 40 disposed at a position in a forward and upward direction of the seat 4, and the driver 11 seated in the seat 4.

In this case, because the driver 11 is seated in the seat 4, a millimeter-band detection radio wave output from an output antenna such as the first output antenna 31 or the second output antenna 32 may be reflected by the surface of the driver 11. A millimeter-band reflected wave by the driver 11 returns to the in-cabin millimeter-wave sensor 40. The millimeter-band reflected wave is input to the plurality of input antennas of the in-cabin millimeter-wave sensor 40. The in-cabin millimeter-wave sensor 40 can detect the reflected wave stronger than in the state of FIG. 11.

Figure 13:
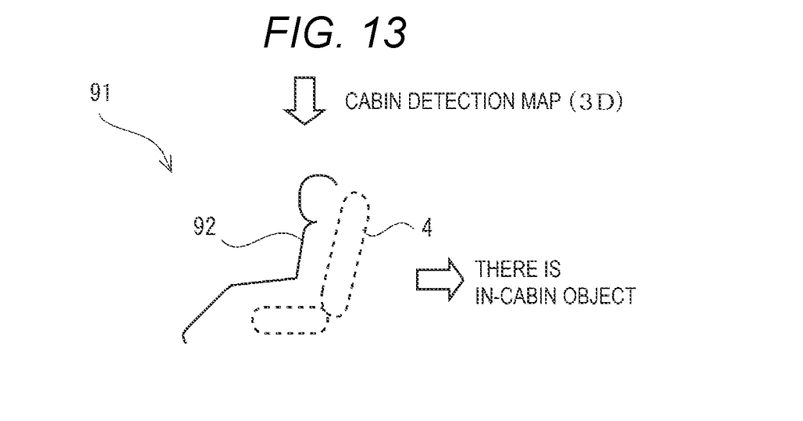
FIG. 13 is a diagram illustrating a three-dimensional cabin detection map generatable based on detection of reflected waves by the in-cabin millimeter-wave sensor in the second detection state in FIG. 12.

FIG. 13 is a diagram illustrating a three-dimensional cabin detection map 91 generatable based on detection by the in-cabin millimeter-wave sensor 40 in the second detection state in FIG. 12.

FIG. 13 illustrates the seat 4 and a detected reflection surface 92 of the occupant seated in the seat 4. When using a combination of the output in two channels and the input in four channels by the in-cabin millimeter-wave sensor 40, the CPU 41 of the cabin monitoring apparatus 21 can separate a reflected wave component in each direction from an input wave, which is a mixture of a plurality of reflected waves, so as to calculate a distance to a reflection object in each direction. At this time, the CPU 41 of the cabin monitoring apparatus 21 may change output timings of millimeter-band detection signals from the plurality of output antennas of the in-cabin millimeter-wave sensor 40 and may change detection periods and timings of millimeter waves from the plurality of input antennas. As a result, the CPU 41 of the cabin monitoring apparatus 21 can obtain a distance of the reflected wave in each incident direction when the disposed position of the in-cabin millimeter-wave sensor 40 is regarded as a reference, so as to generate the cabin detection map 91 including the three-dimensional reflection surface 92 along the surface of the occupant as indicated by the solid line in FIG. 13.

Then, the CPU 41 of the cabin monitoring apparatus 21 can acquire vital information such as a breathing rate of the occupant based on a cyclic fluctuation of the reflection surface 92 of the chest of the occupant in FIG. 13 over time.

Figure 14:
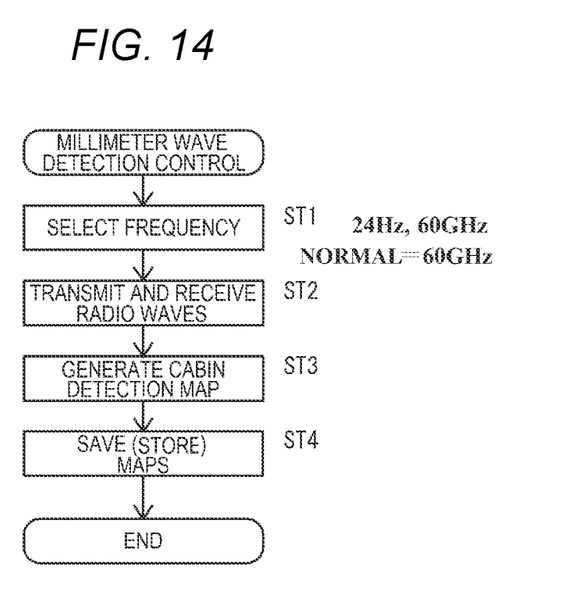
FIG. 14 is a flowchart of millimeter-wave detection control by a CPU of the cabin monitoring apparatus in FIG. 3.

FIG. 14 is a flowchart of millimeter wave detection control by the CPU 41 of the cabin monitoring apparatus 21 in FIG. 3.

The CPU 41 of the cabin monitoring apparatus 21 repeats a process illustrated in FIG. 14.

The CPU 41 may repeat the process illustrated in FIG. 14 at every detection cycle measured by the timer 43.

At step ST1, the CPU 41 selects a frequency of a millimeter-band detection radio wave for detecting an in-cabin object such as an occupant and an object present in the vehicle cabin 3 from among a plurality of potential frequencies of 24 GHz and 60 GHz. A millimeter wave at a frequency as low as 24 GHz is suitable for detecting an in-cabin object in the baggage compartment 6 behind the rear seat 5 and at the foot of the rear seat 5. A millimeter wave at a frequency as high as 60 GHz can detect, for example, a fluctuation of a surface of the chest of an occupant with high resolution.

During normal operation, for example, while the automobile 1 is traveling, the CPU 41 may select the high frequency of 60 GHz to detect a breathing movement of the chest surface of the occupant present in the vehicle cabin 3.

In the case of detecting an in-cabin object such as the child 13 and an object left behind, the CPU 41 may select the low frequency of 24 GHz to detect the vehicle cabin 3 from corner to corner.

At step ST2, the CPU 41 causes the first output antenna 31 and the second output antenna 32 to outputs a millimeter-band detection radio wave at the selected frequency, and detects input of millimeter-band reflected waves. The CPU 41 instructs the output controller 37 to output the millimeter-band detection radio wave. The output controller 37 outputs the millimeter-band detection radio wave at the selected frequency from the first output antenna 31 and the second output antenna 32. At this time, the output controller 37 may scan the vehicle cabin 3 by, for example, adjusting an interval between an output timing of the millimeter-band detection radio wave from the first output antenna 31 and an output timing of the millimeter-band detection radio wave from the second output antenna 32.

When there is an occupant seated in the seats 4 and 5 in the vehicle cabin 3 and when there is an object in the seats 4 and 5 and the baggage compartment 6, the millimeter-band detection radio wave is reflected by the occupant and the object. Reflected waves by these in-cabin objects are input to the first input antenna 33, the second input antenna 34, the third input antenna 35, and the fourth input antenna 36 of the cabin monitoring apparatus 21. The input controller 38 generates information of the input of the reflected wave to the first input antenna 33, information of the input of the reflected wave to the second input antenna 34, information of the input of the reflected wave to the third input antenna 35, and information of the input of the reflected wave to the fourth input antenna 36, and outputs the information to the CPU 41.

At step ST3, based on the detection information of the reflected waves from the input controller 38, the CPU 41 generates the cabin detection map 91 indicating a position and a range of the reflection surface 92 of an in-cabin object, such as an occupant or an object occupying the vehicle cabin 3, in the vehicle cabin 3. Basically, the cabin detection map 91 may illustrate a range in the vehicle cabin 3 indicated by the single chain line in FIG. 1 that has been detected by the millimeter-band reflected waves. Based on the reflected waves reflected by each component of the vehicle cabin 3 of the automobile 1 and detected by the in-cabin millimeter-wave sensor 40, the CPU 41 as the controller generates the cabin detection map 91, which is a detection result of the vehicle cabin 3 in the automobile 1.

At step ST4, the CPU 41 records the cabin detection map 91 thus generated on the memory 42 along with information of detection times of day measured by the timer 43. As a result, a plurality of the cabin detection maps 91 generated at timings different from one another are recorded on the memory 42 in association with the information of the respective detection times of day. The plurality of cabin detection maps 91 include information as to movements of the occupant and the object in the vehicle cabin 3.

Figure 15:
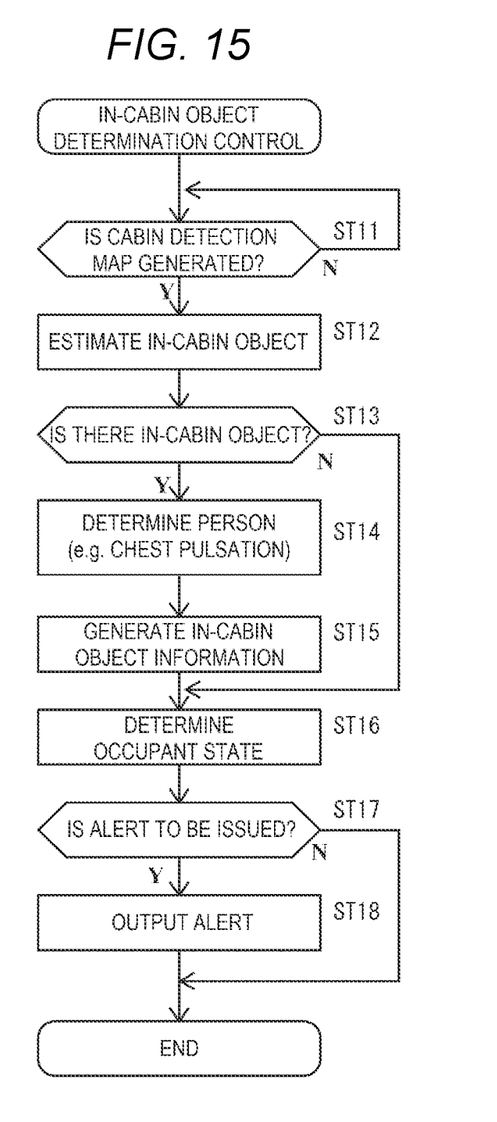
FIG. 15 is a flowchart of in-cabin object determination control by the CPU of the cabin monitoring apparatus in FIG. 3.

FIG. 15 is a flowchart of in-cabin object determination control by the CPU 41 of the cabin monitoring apparatus 21 in FIG. 3.

Each time the millimeter wave detection control illustrated in FIG. 14 is performed, for example, the CPU 41 of the cabin monitoring apparatus 21 repeats a process illustrated in FIG. 15.

The CPU 41 may repeat the process illustrated in FIG. 15 at every detection cycle measured by the timer 43.

At step ST11, the CPU 41 determines whether a new cabin detection map 91 has been generated. The CPU 41 may determine, for example, based on whether a cabin detection map 91 generated anew has been recorded on the memory 42. When no new cabin detection map 91 has been generated, the CPU 41 repeats this process. When a new cabin detection map 91 has been generated, the CPU 41 makes the process proceed to step ST12.

At step ST12, the CPU 41 estimates an in-cabin object based on the new cabin detection map 91. The cabin detection map 91 includes components of the reflection surfaces 92 of the occupant and the object that have reflected the millimeter-band detection radio wave. The CPU 41 may estimate the in-cabin object based on a difference component between the new cabin detection map 91 and, for example, a cabin detection map 91 when there are not any occupants and objects. The CPU 41 may estimate a size of the in-cabin object from a range in the cabin detection map 91 that includes the difference component. The CPU 41 may estimate, for example, a position of the seat 4, 5 where the in-cabin object that has generated the difference component is present based on a position of the range that includes the difference component when the position of the cabin monitoring apparatus 21 is regarded as a reference. The CPU 41 may estimate a size and a position of each of a plurality of in-cabin objects present in the vehicle cabin 3.

At step ST13, the CPU 41 determines whether there is an in-cabin object. When even one in-cabin object is estimated at step ST12, the CPU 41 determines that there is an in-cabin object, and makes the process proceed to step ST14. When no in-cabin object is estimated, the CPU 41 determines that there is no in-cabin object, and makes the process proceed to step ST16.

At step ST14, the CPU 41 determines whether the in-cabin object is a person (occupant) or an object.

In this determination as to whether the in-cabin object is a person or an object, the CPU 41 generates, for example, a locus of a position in a predetermined direction estimated as a range of the in-cabin object in a plurality of cabin detection maps 91 from the past cabin detection maps 91 to the latest cabin detection map 91. The CPU 41 may plot the position in the predetermined direction at each timing in a position locus diagram, for example, where the horizontal axis represents time, and the vertical axis represents a relative position. When the position in the predetermined direction is the chest surface of the occupant, a waveform as the plotted locus of the position corresponds to a movement of the chest surface that fluctuates in accordance with breathing by the occupant.

An adult seated in the seat 4, 5 in a normal state breathes approximately 15 times per minute. The child 13 in many cases breathes approximately 20 times or more per minute even in a normal state.

Unless a waveform as the locus of the position plotted for 20 seconds or longer, for example, includes such a fluctuation component of several times to several tens of times per minute, the CPU 41 determines that the estimated in-cabin object is not a person but an object.

When a waveform as the plotted position locus includes a fluctuation component that may be estimated as chest pulsation of several times to several tens of times per minute, the CPU 41 determines that the estimated in-cabin object is an occupant as a person.

When a fluctuation component is equal to or less than a threshold of 20 times per minute, for example, the CPU 41 may further determine that the determined occupant is an adult.

Meanwhile, when a fluctuation component is larger than the threshold, the CPU 41 may further determine that the determined occupant is the child 13.

Thus, based on the cabin detection map 91 of the automobile 1 as a determination based on detection of reflected waves by the in-cabin millimeter-wave sensor 40, the CPU 41 can determine the presence and a kind of the occupant, for example, present in the vehicle cabin 3 of the automobile 1.

At step ST15, the CPU 41 generates information of the determined in-cabin object and records the information on the memory 42. The in-cabin object information regarding the occupant and the object riding in the automobile 1 that has been determined at least based on the latest detection is recorded on the memory 42 for each of the in-cabin objects.

At step ST16, the CPU 41 determines a state of the occupant using the in-cabin object information recorded on the memory 42 at step ST15. The CPU 41 may determine, for example, whether the occupant is in an excited state based on a pulse of the occupant.

At step ST17, the CPU 41 determines whether to issue an alert to the occupant based on a determination result of the occupant state at step ST16. For example, when the CPU 41 determines that the occupant is in an excited state, the CPU 41 determines that an alert is to be issued to the occupant, and makes the process proceed to step ST18. When nothing is wrong with the occupant state, the CPU 41 determines that an alert is not to be issued to the occupant, and ends the process.

At step ST18, the CPU 41 outputs an alert to the occupant. The CPU 41 outputs the alert via the input/output unit 44 and the in-vehicle network 26. The user interface apparatus 25 outputs an alarm sound from the coupled speaker 27. Then, the CPU 41 ends the process.

As has been described above, in this embodiment, the in-cabin millimeter-wave sensor 40 configured to perform detection in the vehicle cabin 3 of the vehicle body 2 is in the inclined posture and attached to the ceiling of the vehicle cabin 3 above the head of an occupant using the vehicle cabin 3 by the design member 63 of the overhead console. This enables the in-cabin millimeter-wave sensor 40 to detect a wide range in the vehicle cabin 3. For example, even when the child 13 is crouching down at the foot of the rear seat 5, and even when the child 13 is sitting in a seat or the baggage compartment 6 behind the rear seat 5, the in-cabin millimeter-wave sensor 40 can detect the child 13 in such states.

Besides, in this embodiment, the design member 63 used for attaching the modules such as the in-cabin millimeter-wave sensor 40 configured to perform detection in the vehicle cabin 3 of the vehicle body 2 to the ceiling of the vehicle cabin 3 includes the securing portion 71, the surrounding wall 72, and the design constituent 73. The securing portion 71 is secured to the partition plate 65 of the vehicle body 2. The surrounding wall 72 protrudes downward from the outer periphery of the securing portion 71. In one embodiment, the surrounding wall 72 may serve as a "downward protrusion". The design constituent 73 extends from the lower end of the surrounding wall 72 in a direction away from the securing portion 71 and covers the securing portion 71 so as to constitute the design as the design member 63. The in-cabin millimeter-wave sensor 40 is supported by the design constituent 73 in the design member 63. In the accommodating space 75 defined between the surrounding wall 72 and the design constituent 73, the in-cabin millimeter-wave sensor 40 is disposed in such a manner that a gap is left between the in-cabin millimeter-wave sensor 40 and the partition plate 65 above the accommodating space 75. The in-cabin millimeter-wave sensor 40 is supported by the design constituent 73 of the design member 63 of the overhead console wholly in no close contact with the partition plate 65 above the in-cabin millimeter-wave sensor 40.

As a result, in this embodiment, when an upward force is applied to and raises the design member 63 of the overhead console attached to the ceiling of the vehicle cabin 3 above the head of the occupant using the vehicle cabin 3, the design member 63 can buckle not to easily break securing of the securing portion 71 and is deformable upward. In particular, even when an upward force is applied to and raises the portion of the design constituent 73 where the in-cabin millimeter-wave sensor 40 is disposed, the design member 63 is deformable upward. Even when the head, for example, of the occupant collides against the design member 63 attached to the ceiling of the vehicle cabin 3, the design member 63 supporting the in-cabin millimeter-wave sensor 40 can deform to reduce a magnitude of a force exerted onto the portion of the occupant that collides against the design member 63. It can be expected that an impact exerted onto the occupant can be made as small as when the design member 63 is not attached to the ceiling of the vehicle cabin 3.

Although the above-described embodiment is a suitable example of the embodiment for the disclosure, the disclosure is not limited to this embodiment but may be modified or altered in various manners without departing from the subject matter of the disclosure.

For example, in the above-described embodiment, the cabin monitoring apparatus 21 employs the in-cabin millimeter-wave sensor 40 as the in-cabin sensor that performs detection in the vehicle cabin 3.

Other than this, for example, the cabin monitoring apparatus 21 may employ an imaging sensor to capture an image of a vehicle interior as the in-cabin sensor that performs detection in the vehicle cabin 3.

In the above-described embodiment, the in-cabin sensor is disposed in the design member 63 so as to reduce a difference between the distances from the plurality of front seats 4 in the vehicle cabin 3, and to differ the distances from the plurality of front seats 4 in the vehicle cabin 3 from the distance from the rear seat 5 in the vehicle cabin 3. The in-cabin sensor is placed on the design constituent 73 in such a manner that the lower side of the in-cabin sensor is covered with the design constituent 73, and the in-cabin sensor is supported by the design constituent 73. The design member 63 is made of a flexible resin material.

The invention claimed is:

1. An attachment structure of a vehicular module to a ceiling of a vehicle cabin of a vehicle, the attachment structure comprising:
 a design member configured to attach, to the ceiling, the module comprising an in-cabin sensor configured to perform detection in the vehicle cabin,
 the design member comprising
  a securing portion configured to be secured to a vehicle-body ceiling member of the vehicle or an interior ceiling member disposed on a vehicle cabin side of the vehicle-body ceiling member,
  a downward protrusion protruding downward from the securing portion, and
  a design constituent extending from the downward protrusion and covering the securing portion so as to constitute a design as the design member,
 wherein in an accommodating space defined between the downward protrusion and the design constituent, the in-cabin sensor is supported by the design member in such a manner that, above the accommodating space, a gap is left between the in-cabin sensor and the vehicle-body ceiling member or between the in-cabin sensor and the interior ceiling member.

2. The attachment structure according to claim 1,
 wherein the downward protrusion comprises a surrounding wall extending along an outer periphery of the securing portion and protruding downward so as to surround the securing portion,
 wherein the design constituent is folded back upward from a lower end of the surrounding wall as the downward protrusion and extends to surround the surrounding wall,
 wherein an outer peripheral edge of the design constituent folded back upward is disposed in contact with the vehicle-body ceiling member or the interior ceiling member from below around part of the vehicle-body ceiling member or the interior ceiling member where the securing portion is secured, and
 wherein the in-cabin sensor is placed on the design constituent and supported by the design constituent.

3. The attachment structure according to claim 2,
 wherein the in-cabin sensor comprises a plate-shaped sensor member capable of detecting an object in an angle range about a detection direction, the detection direction being a direction of a normal to a detection surface of the plate-shaped sensor member,
 wherein the plate-shaped sensor member is placed on the design constituent and supported by the design constituent while the plate-shaped sensor member is in such an inclined posture that the detection direction is a diagonally downward direction, and
 wherein, above the plate-shaped sensor member, a gap is left at least between a lower end of the plate-shaped sensor member disposed in the inclined posture and the vehicle-body ceiling member or between the lower end of the plate-shaped sensor member and the interior ceiling member.

4. The attachment structure according to claim 3,
 wherein the vehicle-body ceiling member or the interior ceiling member is disposed above an upper end of the plate-shaped sensor member in the inclined posture in such a manner that the vehicle-body ceiling member or the interior ceiling member is closer to the upper end of the plate-shaped sensor member than to the lower end of the plate-shaped sensor member or in contact with the upper end of the plate-shaped sensor member.

5. The attachment structure according to claim 2, wherein the in-cabin sensor is disposed at a position in the design member behind the securing portion in a fore-and-aft direction of a vehicle body of the vehicle.

6. The attachment structure according to claim 2,
wherein a plurality of modules comprising the in-cabin sensor are disposed in the design member, and
wherein the in-cabin sensor is disposed at a rearmost position in a fore-and-aft direction of the vehicle body among the modules disposed in the design member.

7. The attachment structure according to claim 2, wherein the in-cabin sensor is disposed in the design member and at least on a front side of a rear end of a seated portion of a foremost seat in the vehicle cabin so as to detect a surface of a chest of an occupant seated in the foremost seat.

8. The attachment structure according to claim 2, wherein a board connector disposed on the in-cabin sensor is disposed on a side surface of the in-cabin sensor other than a rear side surface of the in-cabin sensor.

9. The attachment structure according to claim 2, wherein the in-cabin sensor is disposed at a center portion of the design member in a vehicle width direction of the vehicle body.

10. The attachment structure according to claim 1,
wherein the in-cabin sensor comprises a plate-shaped sensor member capable of detecting an object in an angle range about a detection direction, the detection direction being a direction of a normal to a detection surface of the plate-shaped sensor member,
wherein the plate-shaped sensor member is placed on the design constituent and supported by the design constituent while the plate-shaped sensor member is in such an inclined posture that the detection direction is a diagonally downward direction, and
wherein, above the plate-shaped sensor member, a gap is left at least between a lower end of the plate-shaped sensor member disposed in the inclined posture and the vehicle-body ceiling member or between the lower end of the plate-shaped sensor member and the interior ceiling member.

11. The attachment structure according to claim 10,
wherein the vehicle-body ceiling member or the interior ceiling member is disposed above an upper end of the plate-shaped sensor member in the inclined posture in such a manner that the vehicle-body ceiling member or the interior ceiling member is closer to the upper end of the plate-shaped sensor member than to the lower end of the plate-shaped sensor member or in contact with the upper end of the plate-shaped sensor member.

12. The attachment structure according to claim 11,
wherein the plate-shaped sensor member of the in-cabin sensor comprises a board connector disposed in such a manner that a cable connector or a flexible printed board configured to be coupled to the board connector is removably insertable in a direction along the detection surface of the plate-shaped sensor member.

13. The attachment structure according to claim 10,
wherein the plate-shaped sensor member of the in-cabin sensor comprises a board connector disposed in such a manner that a cable connector or a flexible printed board configured to be coupled to the board connector is removably insertable in a direction along the detection surface of the plate-shaped sensor member.

14. The attachment structure according to claim 1, wherein the in-cabin sensor is disposed at a position in the design member behind the securing portion in a fore-and-aft direction of a vehicle body of the vehicle.

15. The attachment structure according to claim 1,
wherein a plurality of modules comprising the in-cabin sensor are disposed in the design member, and
wherein the in-cabin sensor is disposed at a rearmost position in a fore-and-aft direction of the vehicle body among the modules disposed in the design member.

16. The attachment structure according to claim 1, wherein the in-cabin sensor is disposed in the design member and at least on a front side of a rear end of a seated portion of a foremost seat in the vehicle cabin so as to detect a surface of a chest of an occupant seated in the foremost seat.

17. The attachment structure according to claim 1, wherein a board connector disposed on the in-cabin sensor is disposed on a side surface of the in-cabin sensor other than a rear side surface of the in-cabin sensor.

18. The attachment structure according to claim 1, wherein the in-cabin sensor is disposed at a center portion of the design member in a vehicle width direction of the vehicle body.

* * * * *